Dec. 6, 1938.　　　　W. H. D. BROUSE　　　　2,139,148
SIGHT GAUGE FOR LIQUID DISPENSING PUMPS
Filed Dec. 31, 1937　　　2 Sheets-Sheet 1

Inventor.
William H. D. Brouse.

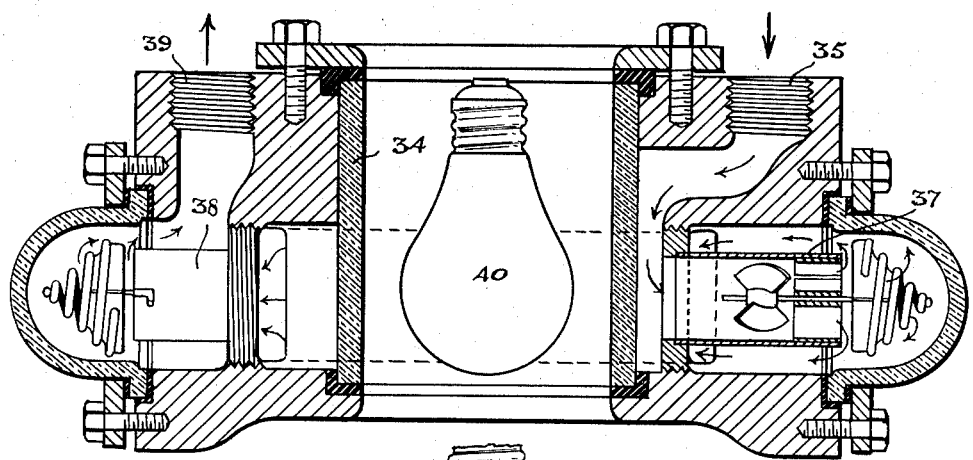
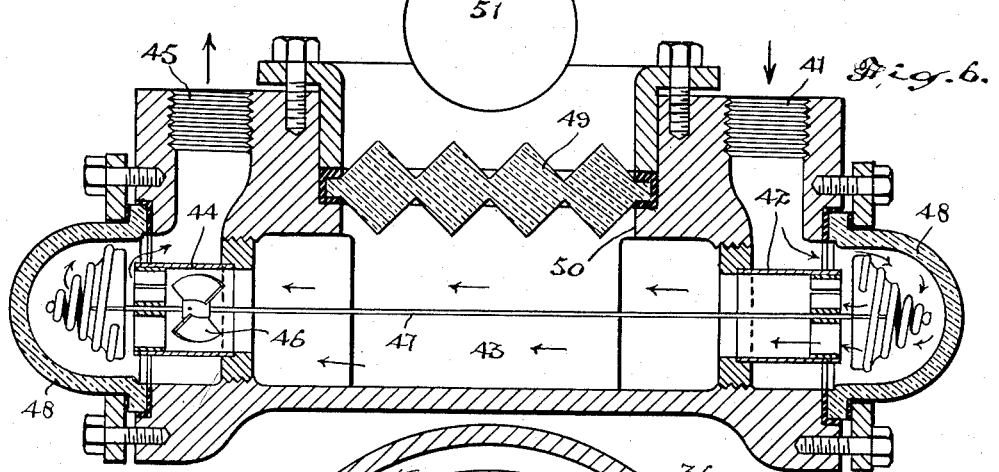
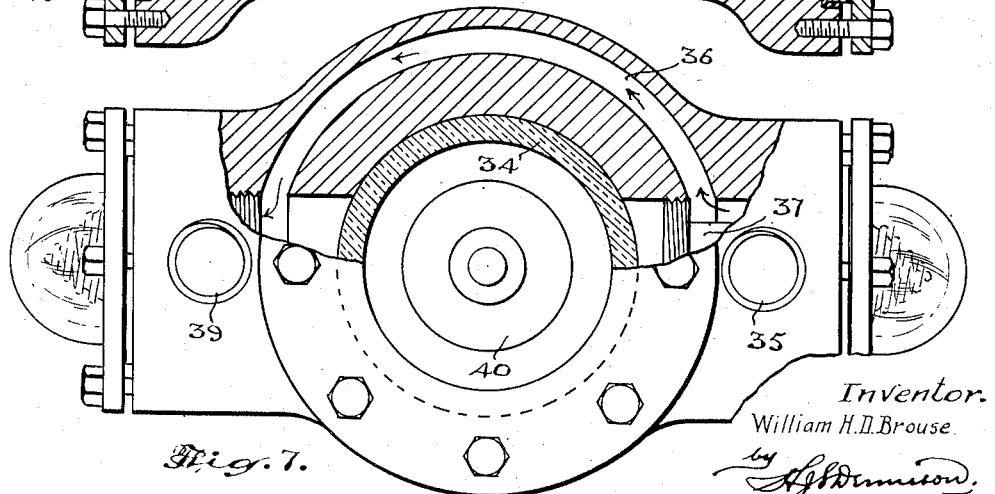

Patented Dec. 6, 1938

2,139,148

UNITED STATES PATENT OFFICE 2,139,148

SIGHT GAUGE FOR LIQUID DISPENSING PUMPS

William H. D. Brouse, Toronto, Ontario, Canada, assignor to International Metal Industries Limited, Toronto, Ontario, Canada Application December 31, 1937, Serial No. 182,864

12 Claims. (Cl. 116—117)

One of the objects of this invention is to provide a device to be incorporated in liquid dispensing apparatus, which device will be readily visible from various angles and will present an instantaneously visible indication of the fact that the pump is operating and that the liquid is flowing.

Further objects are to devise a structure in which the visible gauge portion will be effectively illuminated and from which the liquid drains readily when the liquid level in the dispensing apparatus is lowered and from which air is expelled when the liquid level is raised.

An important feature of the invention consists in the novel arrangement of protuberant glass cups connected with a liquid-circulating passage and having a rotating member supported therein, the passage being provided with a transparent portion adapted to transmit light from a light source to be directed through the flowing fluid to illuminate the rotating element in the transparent cups.

Numerous forms of structures may be devised to which the present invention may be applied.

In the accompanying drawings Figure 1 is an elevational view of the upper portion of the frame of a fuel-dispensing pump showing my improved sight gauge applied thereto.

Figure 5 is a vertical sectional detail of a slightly modified form of construction of the sight gauge.

Figure 6 is a section similar to Figure 5 showing a further modified form of device.

Figure 7 is a part top plan and part horizontal sectional view of the structure illustrated in Figure 5.

Figure 1:
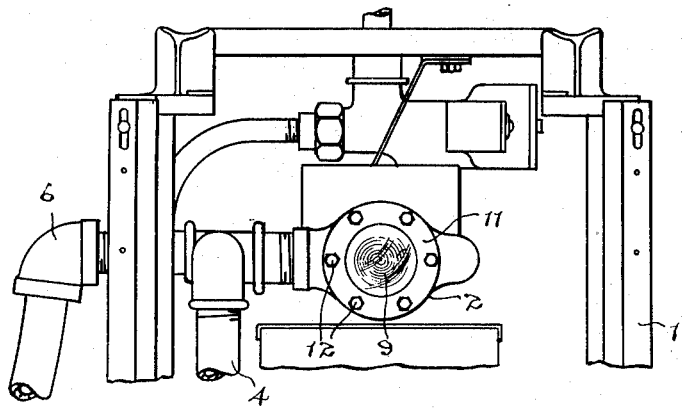
Figure 2:
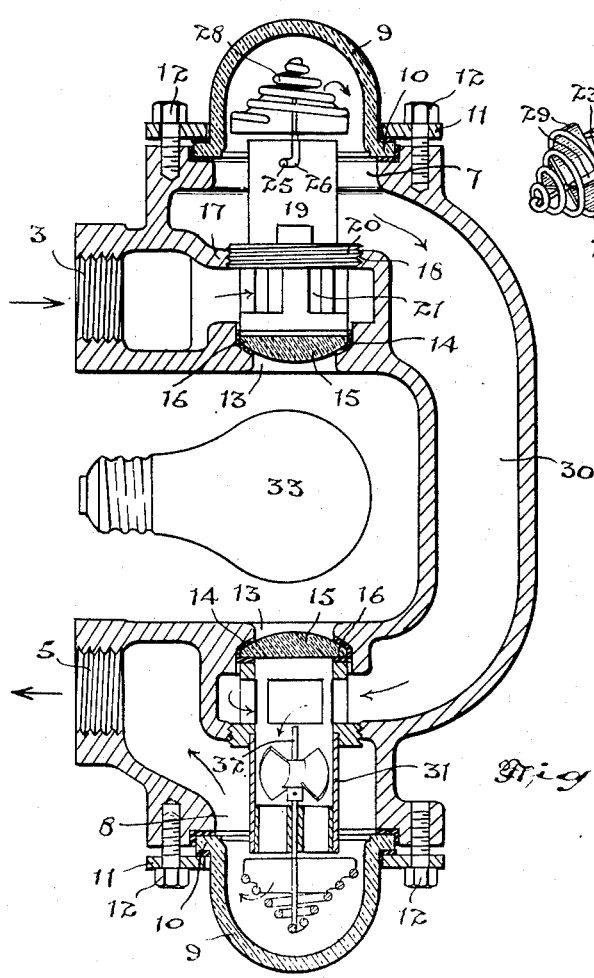
Figure 2 is an enlarged horizontal sectional view through the preferred form of my improved sight gauge.
Figure 3:
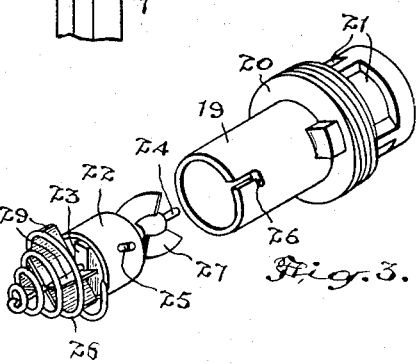
Figure 3 is an enlarged perspective detail of the rotating element and the sleeve member for supporting the same, the rotor member and its bearing supports being shown separated from the sleeve.
Figure 4:
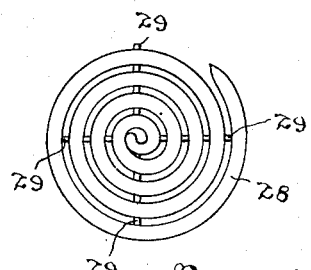
Figure 4 is a full size plan detail of the conically-coiled visible portion of the rotor member.

Referring to the accompanying drawings, the frame 1 of the dispensing apparatus has mounted therein adjacent to the top a sight gauge device 2 which, in the form illustrated in Figure 2, is of substantially U-shape construction having the inlet 3 thereof connected with the pipe 4 leading from the pump and meter of the apparatus, said gauge also having an outlet 5 connected with the discharge hose connection 6.

The U-shaped structure, as illustrated particularly in Figure 2, is of tubular form and is provided with a pair of flanged circular openings 7 and 8 arranged at the opposite sides of the U-shaped structure and in axial alignment the one with the other.

In each of these openings is arranged a cup-shaped glass 9 formed with a peripheral flange 10 which is bedded in a suitable gasket and rigidly secured in position by a clamping ring 11 secured in place by the bolts 12.

Arranged in axial alignment with the openings 7 and 8 at the inner side of the U-shaped structure are openings 13 which are provided with internal shoulders 14 and lenses 15 mounted in sealing gaskets 16 are arranged to seal against the shoulders 14 and close the openings 13.

On the inlet side of the structure of the gauge a partition wall 17 is formed with a threaded opening 18 in axial alignment with the openings 13 and in this threaded opening is mounted a sleeve 19 provided with a threaded flange 20 to engage the thread of the opening. One end of the sleeve 19 is adapted to abut the lens 15 to hold it securely in place with a liquid-tight joint against the shoulder 14.

A portion of the sleeve between the lens and the threaded flange is provided with a plurality of openings 21 through which the liquid flowing into the inlet 3 passes to the sleeve. Mounted within the outward end of the sleeve 19 is an inner sleeve 22 which supports a spider carrying a central bearing 23 in which a spindle 24 is rotatably mounted. The inner sleeve 22 is held in position by a pin 25 thereon which engages a bayonet slot 26 in the sleeve 19.

Mounted upon the spindle 24 at its inward end is a propeller 27, the blades of which are engaged by the flowing liquid to rotate the spindle. At the outward end beyond the spider, the spindle has mounted thereon a spiral or helical member 28 preferably formed of a piece of round bright wire which will retain a polish and light-reflecting surface.

Right-angularly arranged vanes 29 are secured to the spindle and fit inside the spiral member 28. The end of the spindle carrying the spiral member 28 extends into the transparent glass cup 9 so that the light-reflecting spiral will be readily seen from a distance of 180° or more.

The liquid flowing into the inlet 3 flows through the openings 21 of the inner end of the sleeve 19 and flows through the sleeve and is discharged into the cup. The liquid in passing through the sleeve operates the propeller 27 to rotate the spindle and impart a rotating motion to the spiral 28. This rotating motion is checked by the radial vanes 29 so that the spiral does not accelerate its speed of rotation until it becomes a blur, but is always clearly visible as producing a spiral effect.

The fluid flowing into the cup is carried by the conduit 30 forming the bottom of the U-shaped member and is directed into the sleeve 31 corresponding with the sleeve 19. The sleeve 31 has arranged therein a propeller-driven spindle 32 which carries a spiral precisely similar to the spiral 28, but the fluid flows through the said spiral into the interior of the cup and passes out to the discharge passage 5.

A lamp 33 is suitably mounted and supported centrally of the U-shaped member and preferably directly between the lenses 15 and the light produced by said lamp is concentrated by said lenses and directed in a beam through the sleeve members 19 and 31, so that the liquid flowing therethrough is illuminated and the illumination is carried through to the glass cup and the light reflected by the liquid and by the reflecting surface of the spirals mounted on the rotating spindles are very clearly displayed so that they will be seen from in front of and from the sides of the apparatus, so that the customer being served sees at a glance, no matter what position he may be in, that the pump is working and that the liquid is flowing.

Various forms of this invention may be developed and in Figure 5 I show a circular structure with projecting portions carrying the cup-shaped lenses. In this structure a cylindrical glass tube 34 is sealed in the cylindrical recess and the inlet passage 35 communicates with a semi-circular passage 36 after passing through the sleeve member 37 and operating the fan-driven spindle. The liquid flowing around the passage 36 flows into and through the sleeve 38 at the opposite side and after passing through the sleeve into the cup, it flows out the outlet passage 39.

The light bulb 40 is arranged within the glass tube 34 and the light emanating therefrom shines radially outward through the liquid flowing outwardly through the sleeves 37 and 38, thus illuminating the glass cups arranged thereon.

In the structure illustrated in Figure 6 the liquid flows inwardly through the passage 41 and flowing around the exterior of the spindle-carrying sleeve 42, it flows inwardly through the spiral and sleeve and across the passage 43 from whence it passes through the sleeve 44 and passes outwardly through the outlet 45, engaging the propeller 46 mounted on a spindle 47 which extends completely across the device and supports a spiral display member at each end extending well into the glass cups 48 sealed on either side of the device.

A prismatic glass disc 49 is sealed in the central opening 40 and the light from a bulb 51 or from any other adjacent light source will be picked up by the prismatic glass disc and directed into the flowing stream of liquid so that the glass cups at the opposite ends of the shaft will be illuminated.

A device constructed as described is extremely attractive. The shining spirals within the liquid being dispensed are visible from practically all angles as they are rotated by the flow of liquid and as light is directed by reflection or refraction into the stream of liquid, the protruding glass cups carry the illumination so that a very positive indication is presented on the pump displaying the flowing liquid when the pump is operating.

It will be readily appreciated that many changes of construction can be effected within the scope of this invention as hereinbefore set forth.

What I claim as my invention is:—

1. A sight gauge for liquid dispensing pumps having a liquid flow passage provided with oppositely disposed transparent elements, rotatable light-reflecting members supported adjacent to and visible through said transparent elements, means operated by the flow of liquid for rotating said reflecting members, and means for directing light through the liquid to illuminate said transparent and light reflecting members including a light source disposed between and directing rays toward said respective light-reflecting members.

2. A sight gauge for liquid dispensing pumps having a liquid flow passage provided with oppositely disposed openings, cup shaped members of transparent material sealed in said openings and protruding therefrom, light reflecting members mounted to rotate within said cup members, means operated by the flow of liquid for rotating said reflecting members, and means for directing light through the liquid to illuminate said transparent and reflecting members including a light source common to all of said light-reflecting members and a transparent baffle or partition forming a retaining wall for said liquid and segregating the liquid from contact with said light source.

3. A sight gauge for liquid dispensing pumps having a liquid flow passage of a looped formation presenting oppositely disposed inner walls and outer walls, transparencies oppositely arranged in the inner walls of the loop, transparent cup shaped members arranged in the outer walls of the looped formation in alignment with the inner transparencies and projecting outwardly, a source of light arranged to direct light rays through the inner and outer transparencies, flow indicating devices rotatably mounted in said liquid passage and extending into said cup shaped members, and means operated by the flow of liquid for rotating said flow indicating devices.

4. A sight gauge for liquid dispensing pumps comprising a U-shaped tubular member having opposed inner and outer walls and openings extending transversely therethrough arranged in axial alignment, transparent lenses closing the innermost wall openings, transparent cupped members closing the outer wall openings, sleeve members extending axially between the inner and outer wall openings and having openings at their inward ends to permit the inflow of liquid, bearings centrally supported in said sleeves, a spindle supported in each of said bearings, spindle propeller means actuated by the flow of liquid, flow indicating members mounted on the spindle ends and extending into the transparent cups, and means arranged to direct light rays in an outward direction through the lenses.

5. A sight gauge for liquid dispensing pumps having a liquid passage, a glass member mounted in an opening on the outer side of said passage, a spindle rotated by the flow of liquid, a spiral coil of wire mounted on said spindle, and means for directing light rays through the liquid to illuminate the rotating wire coil.

6. A sight gauge for liquid dispensing pumps having a liquid passage, cup shaped glass members projecting from said liquid passage, sleeve members arranged in said passage and directing the flow of liquid into and around the interior of said cups, spiral members rotatably mounted at the ends of said sleeve members and extending into said cups and actuated by the flow of liquid, radial vanes arranged within said spirals to control their speed of rotation, and means for directing light rays through said liquid passage toward said spiral members to provide an illuminated motional indication visible through said glass members.

7. A sight gauge for liquid dispensing pumps comprising a tubular U-shaped member provided with inner, outer and intermediate walls, the outer walls having a pair of oppositely arranged circular openings, the intermediate walls having threaded openings aligned with the aforesaid openings, glass cups having flanged edges sealed in said circular openings and projecting from said U-shaped structure, the inner walls of said tubular member having flanged circular openings arranged axially opposite the aforesaid openings, lenses sealed in said latter flanged openings, sleeve members abutting said lenses and having threaded flanges threaded into the threaded openings in said intermediate wall, said sleeves also having liquid-conducting openings adjacent their inward ends, rotary members mounted axially of said sleeves to be rotated by the flow of liquid therethrough, light intercepting means mounted on the ends of said rotary members and extending into said cups, and a light source arranged between said lenses.

8. A device as claimed in claim 1 having a central light well for the accommodation of the light source, and a transparent wall sealed in said light well to permit passage of light rays from the light source to the liquid.

9. A device as claimed in claim 1 having a circular central light well containing said light source and opening into the liquid flow passage, and a glass cylinder sealed in said light well and surrounding said light source and permitting the flow of light into the liquid passage.

10. A sight gauge for liquid dispensing pumps having a liquid flow passage including inlet and outlet passages, oppositely disposed transparent elements disposed respectively at the junction of said inlet and outlet passages and said liquid flow passage to one side of said inlet and outlet passages respectively, rotatable light-reflecting members in offset relation to said inlet and outlet passages adjacent to and visible through said transparent elements, means operated by the flow of liquid for rotating said reflecting members, means arranged within the liquid flow passage in register with said inlet and outlet passages for directing the flow of liquid in circuitous paths from and to said inlet and outlet passages respectively to contact the inner surface of said transparent elements and flow about said offset light-reflecting members, and means for directing light rays toward said light-reflecting members.

11. A sight gauge for liquid dispensing pumps having a liquid flow passage provided with oppositely disposed transparent elements, rotatable light-reflecting members supported adjacent to and visible through said transparent elements, means operated by the flow of liquid for rotating said reflecting members, said rotatable members each comprising a helical member mounted upon a spindle, and means for illuminating said light-reflecting members.

12. A sight gauge for liquid dispensing pumps having a liquid flow passage provided with oppositely disposed transparent elements, rotatable light-reflecting members supported adjacent to and visible through said transparent elements, means for illuminating said light-reflecting members, means operated by the flow of liquid for rotating said reflecting members, said rotatable members each comprising a helical member mounted upon a spindle, and radial vanes arranged on said spindle.

WILLIAM H. D. BROUSE.